Aug. 14, 1945.　　　W. H. JONES　　　2,382,883
LUBRICATED LATHE CENTER
Filed Feb. 22, 1944
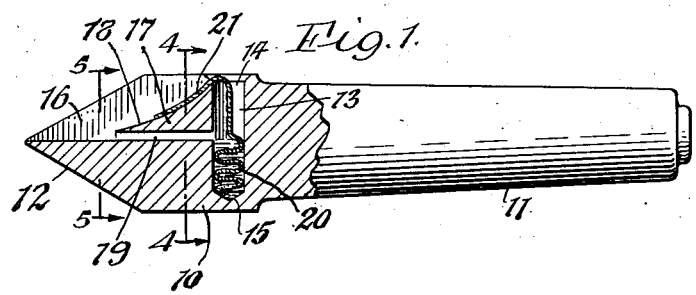
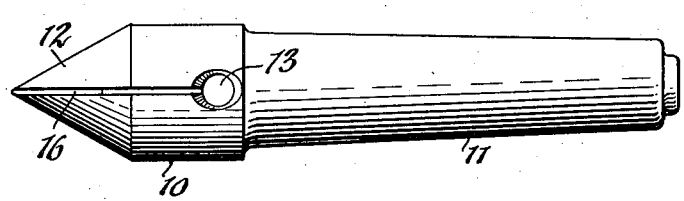
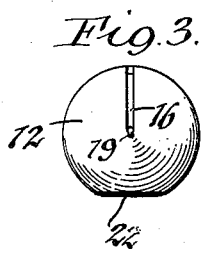
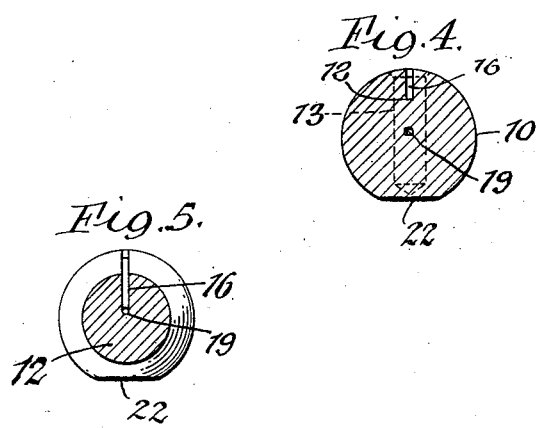
INVENTOR.
Willis H. Jones
BY
ATTORNEYS Patented Aug. 14, 1945

2,382,883

UNITED STATES PATENT OFFICE 2,382,883

LUBRICATED LATHE CENTER

Willis H. Jones, Kenmore, N. Y.

Application February 22, 1944, Serial No. 523,423

3 Claims. (Cl. 82—33.)

This invention relates to a lathe center and more particularly to a lathe center for the tail stock of a lathe for lubricating the conical tip or bearing point of the same in order to prevent the same from becoming unduly heated and wearing out rapidly as the workpiece is rotatably supported thereon.

It is the object of this invention to provide a lathe center of this character which is comparatively simple in construction and low in cost and which is efficiently and reliably lubricated so as to avoid undue heating and rapid wear and thus prolong the life of the lathe center and eliminate undue interruption in the operation of the lathe in which the workpieces are turned.

In the accompanying drawing:

Fig. 1 is a side elevation, partly in section, of a lathe center embodying a preferred form of the lubricating means which are constructed in accordance with this invention and embody an oil lifting wick.

Fig. 2 is a top plan view of the same but omitting the oil lifting wick.

Fig. 3 is a front elevation of the same.

Figs. 4 and 5 are cross sections thereof, taken on the correspondingly numbered lines in Fig. 1, but omitting the lifting wick.

In the following description similar reference numerals indicate like parts in the several figures of the drawing.

In its general construction the body of the lathe center is similar to those now in common use and comprises a comparatively large cylindrical head 10, a reduced rearwardly tapering shank or stem 11 which projects rearwardly from the rear side of the head and is adapted to be mounted on the tail stock of a turning lathe, and a forwardly tapering or conical point 12 which projects forwardly from the front side of the head and upon which the workpiece to be turned is rotatably supported in the usual and well known manner while the cutting tool of the lathe is operating on the workpiece.

The periphery of the conical point of this lathe center upon which the workpiece rotates is lubricated in accordance with this invention as follows:

The numeral 13 represents a vertical oil storage well or recess which is formed in the rear part of the head and has an open upper inlet end 14 which extends to the upper side of the head while its lower end terminates short of the underside of this head and thus provides a closed bottom 15 for the well.

Within the conical point of the lathe center is a narrow distributing slit or channel 16 which extends lengthwise from the extreme front end of the tip rearwardly to the upper end of the well and is open at its top throughout the length thereof. The front part of this channel extends downwardly to the axial center of the conical tip but the rear part of the same terminates at its lower end above the longitudinal axis of the tip and head by an intervening solid wall or partition 17 the upper side of which forms an inclined bottom 18 for the rear part of this channel which rises from the bottom of the deepest front part of the channel to the upper end of the well, as shown in Fig. 1.

The numeral 19 represents a longitudinal passage or tunnel arranged axially in the conical tip and the cylindrical head of the body and extending from the pointed front end of the tip to the central part of the well. This tunnel is of comparatively small cross section and preferably equal in diameter to the width of the narrow channel 16 and has its front part communicating with the front part of the channel a considerable distance while the rear part of this tunnel is closed at the top by the solid wall 17 of the tip and head interposed between the bottom of the channel and the rear part of the tunnel, as shown in Figs. 1 and 4.

Preparatory to using this lathe center lubricating oil is introduced into the well through the upper end thereof and some of this oil flows from the well intermediate of its height through the tunnel into the upright slot or channel. Due to the narrow formation of this channel the oil is raised therein by surface tension and delivered to the conical bearing surface of the point and thus lubricates the workpiece which rotates on this point. As the point and head become slightly heated during use the oil in the channel and tunnel is expanded and some of it is forced backwardly through the tunnel into the well and rises in the latter thus maintaining a constant head in the latter the pressure of which operates constantly to force the oil forwardly through the tunnel and maintain a film of oil on the conical bearing surface of the point and thus lubricate the cooperating surfaces of the lathe center and the workpiece.

To further aid the flow of oil from the well to the channel a wick is employed which has a lower vertical part 20 arranged in the well and resting on the bottom thereof and an upper part 21 which projects laterally from the upper end of the lower part into the channel and rests on the inclined bottom of the same, as shown in Fig. 1.

This wick lifts oil by capillary action from the well into the channel from which it flows to the conical bearing surface of the point and lubricates the same. When the flow of oil into the distributing channel exceeds its capacity or when the oil becomes slightly heated while the lathe center is in use part of the oil is forced rearwardly from the distributing channel through the tunnel into the well from which it is again lifted by the wick and returned to the distributing channel.

By this means the oil is circulated in the lathe center and maintained in a fluid condition best suited for lubricating the bearing surface of the lathe center.

In order to prevent the lathe center from rolling on a support when the same is deposited thereon while removed from the lathe, the underside of the head of the center is provided with a flat or non-circular face 22, as shown in Figs. 2, 3 and 4, which face when resting on a support holds the center in an upright position in which its well 13 opens upwardly and thus prevents the oil from running out of the well when the lathe center is not in use.

I claim as my invention.

1. A lathe center comprising a body having a head, a shank projecting rearwardly from the head and a conical point projecting forwardly from the head, an oil receiving well extending downwardly in the head from the top thereof, a tunnel extending lengthwise of the axis of the body from the conical point to said well, a distributing channel arranged in the upper part of the body and extending from the tip of the same to said well and having its front part communicating with the front end of said tunnel while its rear end is separated from the rear end of said tunnel by an intervening wall of said body, and a wick having a lower part arranged in said well and an upper part arranged in said channel.

2. A lathe center comprising a body having a head, a shank projecting rearwardly from the head and a conical point projecting forwardly from the head, an oil receiving well extending downwardly in the head from the top thereof, a tunnel extending lengthwise of the axis of the body from the conical point to said well, a distributing channel arranged in the upper part of the body and extending from the tip of the same to said well and having its front part communicating with the front end of said tunnel while its rear end is separated from the rear end of said tunnel by an intervening wall of said body, and the bottom of said channel being inclined and rising from the front part of said tunnel to the upper part of said well, and a wick having a lower part arranged in said well and an upper part arranged in said channel and resting on the inclined bottom thereof.

3. A lathe center comprising a body having a central head, a rear shank and a front point, a vertical well formed in the head and adapted to receive lubricating oil, an inclined channel formed in the upper side of the point and head and extending upwardly from the front axial part of the point to the upper end of the well, and a wick having one part arranged in the well and another part arranged in said channel.

WILLIS H. JONES.